PHONOGRAPH SPINDLE ACTUATION LEVER

Filed July 26, 1965 2 Sheets-Sheet 1

Inventors
Allen J. Bury
George Kolomayets
By Nicholas A Camasto
Atty.

Oct. 10, 1967 G. KOLOMAYETS ETAL 3,346,261

PHONOGRAPH SPINDLE ACTUATION LEVER

Filed July 26, 1965 2 Sheets-Sheet 2

3,346,261

PHONOGRAPH SPINDLE ACTUATION LEVER

George Kolomayets, Chicago, and Allen J. Bury, Prospect Heights, Ill., assignors to Admiral Corporation, Chicago, Ill., a corporation of Delaware Filed July 26, 1965, Ser. No. 474,904
5 Claims. (Cl. 274—10)

ABSTRACT OF THE DISCLOSURE

An automatic record changing phonograph having a free-floating ejector operated by a unitary actuation lever. The actuation lever is driven by engagement with a main gear, and provides detenting thereof at the termination of a record changing cycle.

This invention relates in general to automatic record changing phonographs, and in particular to the center spindle and actuation means used in automatic phonographs for supporting and individually ejecting a magazined stack of records. More particularly, the invention is concerned with an improved spindle incorporating a freely floating, pinless ejector, and an actuator of unitary construction which may be used alone or in combination with the improved spindle. The actuator also functions as a detent for repositioning a mutilated driving gear at the end of a record changing cycle. The freely floating ejector type spindle is easily manufactured, rapidly and simply assembled, and substantially decreases the need for maintenance or adjustment. The one piece actuator is also easily manufactured, and simplifies the complex linkage heretofore required in many prior art record changing phonographs.

Most commercial automatic phonographs utilize some variety of center spindle incorporating a record ejection mechanism of the pinned type. Pinned spindles are those which have a pivot or guide pin through the ejector body which captivates it within the outer spindle housing. These pins serve as ejector pivots, guides, and in some cases, end stops for limiting ejector movement. When manufacturing pinned-type spindles, difficulties are encountered in tolerances, alignment of the apertures receiving the pins, and clearances. Furthermore, there is the inconvenience and extra expense of an additional part in the form of the pin itself.

Many of these center spindles also use one or more leaf or compression springs within the spindle body to urge the ejector into an inoperative or an "at-rest" position. After extended use these springs tend to lose their original resilience and occasionally impair proper ejector operation. Internal spindle springs also hamper production both from a manufacturing and an assembly standpoint, where special apparatus is required.

In addition, many prior art center spindles translate vertical motion from the automatic phonograph into lateral ejector motion required for proper record ejection. One commonly used type of spindle incorporates a two piece ejector with a cam surface between the pieces which is substantially enclosed by the outer spindle housing. This cam surface is subjected to a relatively heavy load from the magazined stack of records normally supported by the spindle. Consequently, there is a tendency, in many cases, of excessive wear and hence a need for frequent adjustments.

Other prior art spindles require an axial as well as a lateral ejector movement for proper record ejection. Automatic phonographs incorporating these spindles usually use relatively complex ejector actuation means which may include bell cranks, springs, and eccentrics to couple the drive motor to the ejector. The complexity of this coupling linkage, as can be imagined, is generally most undesirable.

This invention overcomes many of the objections and deficiencies of prior art center spindles and spindle actuation mechanisms. A spindle constructed in accordance with the teachings of this invention has a freely floating ejector which obviates the need for any pins or rivets in the ejector assembly. Ejector pivotal motion is provided by a pair of laterally opposed convex protrusions or "bumps" on the ejector, which is laterally supported by the outer housing.

The ejector actuation mechanism of this invention is of unitary, molded plastic, construction and performs a plurality of functions. Upon initiation of a record changing cycle, a mutilated driving gear imparts pivotal motion to the actuator by co-operating with a first cam surface thereon. As the actuator is pivoted, a second cam surface lifts and subsequently rocks the freely floating ejector, which ejects a record from the magazined stack. Finally, the actuator functions as a detent for accurately indexing or repositioning the mutilated driving gear in a normally stationary position upon completion of the record changing cycle.

Utilization of an actuator of molded plastic construction reduces manufacturing costs because of a lower initial die cost, longer die life, and the molding accuracy achievable which eliminates additional machining. An accurately fabricated, single piece actuator also reduces the looseness normally inherent in a complex linkage, and enables the ejector to respond more rapidly to initiation of the change cycle.

The primary object of this invention is to provide a simple, economical, and trouble-free ejector type spindle and spindle actuation means for incorporation in an automatic record playing phonograph.

Another object of this invention is to provide a simplified mechanical coupling between the drive motor and ejector in an automatic phonograph.

A further object of this invention is to provide an improved spindle for use in an automatic phonograph.

A still further object of this invention is to provide an easily assembled spindle in combination with an actuation member of molded plastic, unitary construction.

An additional object of this invention is to facilitate the production of an automatic record changing phonograph of simplified mechanical and economic design.

A feature of this invention resides in the use of a freely floating ejector which eliminates the necessity of pins in the ejector mechanism.

A second feature of this invention lies in the utilization of a member of unitary construction to transmit axial and lateral motion to the ejector and serve as a detent for repositioning the mutilated driving gear.

The primary advantage of this invention resides in an ejector type spindle and an actuator for an automatic record playing phonograph which are extremely economical to manufacture and assemble, and also extremely simple and effective in their modes of operation.

Other objects and advantages of this invention will become apparent upon an examination of the following description taken in conjunction with the accompanying drawings wherein.

Figures 1, 8, 9:
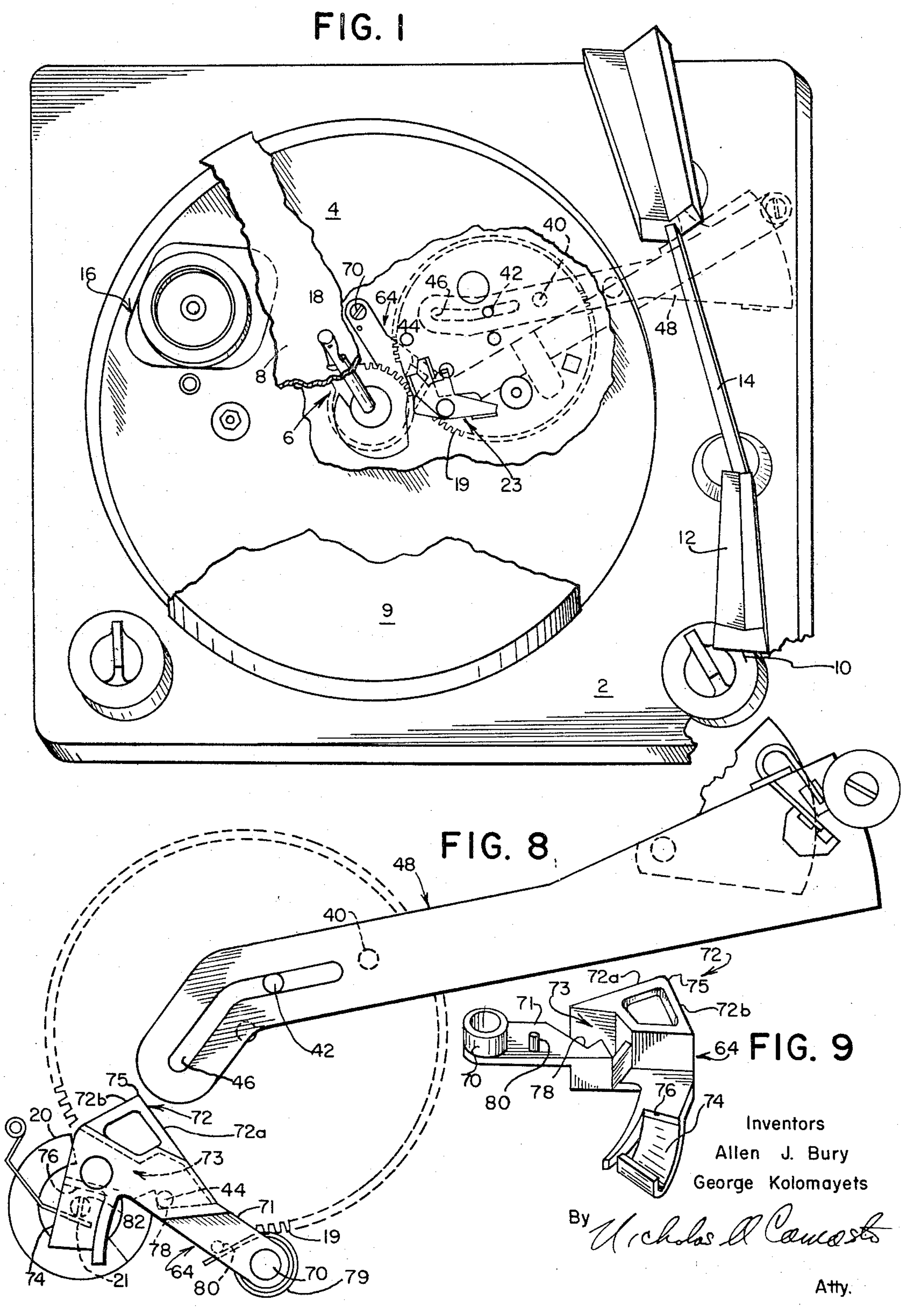
FIG. 1 illustrates a partially cut away perspective view of an automatic phonograph in which the present invention is included.
FIG. 8 is an enlarged plan view of the underside of the automatic photograph in its "at-rest" position, showing only that structure most important to the invention.
FIG. 9 is an enlarged perspecive view of the actuation lever illustrating its various operational surfaces in detail.

The automatic record playing phonograph, as will be particularly noted in FIG. 1, comprises a pan 2, the central area of which contains a depressed circular portion 4 through which is mounted a spindle (generally referred to by reference numeral 6), for supporting and aligning a magazined stack of records 8 to be played. The pan supports a turntable 9 rotatably mounted about the spindle, and the turntable supports a record during playing thereof. A record pick-up stylus 10 and cartridge head 12 are secured to the end of a tone arm 14 which is mounted for horizontal and vertical movement on pan 2 by suitable structure (not shown).

A driving motor 16 suitably mounted to the pan, is drivingly engageable with turnable 9. A geared turntable hub 18 permanently affixed to the underside of turntable 9 is engageable with a mutilated driving gear 19 rotatably mounted on the under side of depressed circular portion 4. The mutilated gear is driven through one full revolution by the geared hub during a record changing cycle responsive to initation thereof by velocity trip means 23 well known in the art as shown, example, in the Vistain Patent 2,983,515 granted June 6, 1961.

Figures 2, 3:
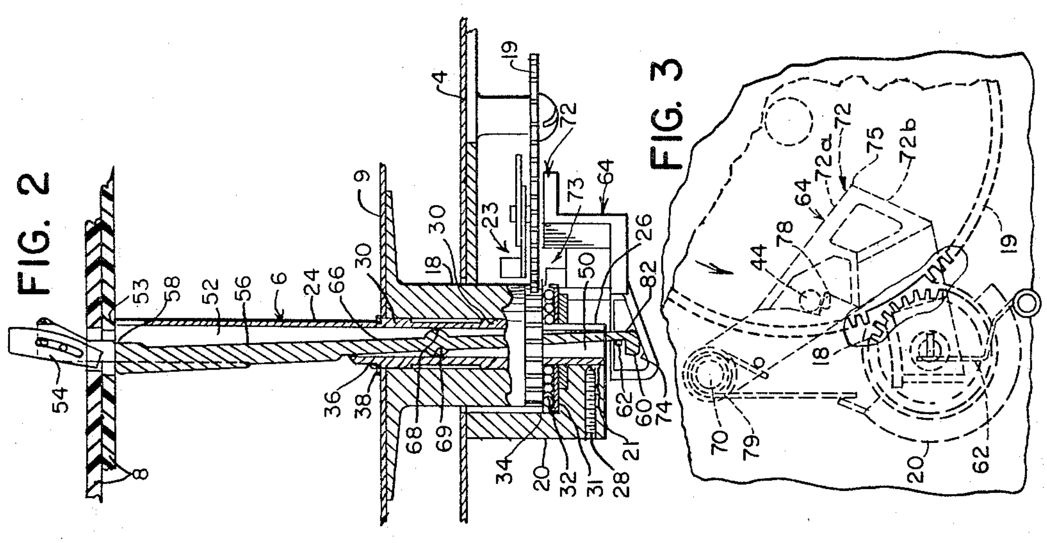
FIG. 2 is a partially broken away, cross sectional, elevation view showing the spindle and actuation lever of the invention in an inoperative or "at-rest" position.
FIG. 3 is a partial top view, with the pan broken away, of the actuation lever, mutilated gear, and stud corresponding to the operating position of FIG. 2.

As best seen in FIGS. 2 and 3, a spindle support 20, having a spindle aperture 21, is fastened to the underside of the depressed circular portion of pan 2 and centrally thereof, by threaded fasteners or the like (not shown). Center spindle 6 is of generally cylindrical shape and includes an outer housing 24, the lower end 26 of which is secured within spindle aperture 21 by a set screw 28. A pair of separated segments on the external surface of the outer housing, just above lower end 26, are machined as bearing surfaces 30 for turntable hub 18.

Turntable hub 18 is supported an axial direction by a top surface 31 of spindle support 20 and smooth turntable operation is insured by interposing a ball bearing 32 and a washer 34 between the otherwise contacting surfaces. A circular groove 36, above and adjacent the uppermost of bearing surfaces 30, is provided with a "C" clip 38 for retaining the turntable in proper axial position. As hereinbefore described, geared hub 18 of turntable 9 is positioned in a drivable relationship with the mutilated gear, rotation of the gear commencing responsive to tripping of velocity trip means 23 located on the upper surface of the mutilated gear substantially adjacent geared hub 18.

Referring momentarily to FIG. 8, three studs, a tone arm plate stud 42, a driving stud 40 and a detent stud 44 are affixed to the underside of the mutilated gear. The tone arm plate stud (that located closest to the center of the mutilated gear) co-operates with a slot 46 (FIGS. 1 and 8) within a tone arm plate 48 for raising and radially moving the tone arm during a record changing cycle.

Lower end 26 (FIG. 2) of the outer spindle housing is provided with a hollow inner portion 50 interconnected with a longitudinally slotted upper portion 52. The longitudinal slot is carried through the side of the outer housing from circular groove 36 to the upper end of the spindle. A recessed horizontal shelf 53 is provided toward the upper end of the outer housing for supporting the magazined stack of records in an elevated position. The recess communicates with slot 52 providing access through the spindle to the shelf and the records supported thereby. A pinned slider arrangement 54 is retained at the top of the outer housing, above the shelf, and within the longitudinal slot. This slider prevents horizontal movement of all except the lowermost record of a stack in a manner well known in the art as shown, for example, in the Faulkner Patent 2,498,333 granted Feb. 21, 1950.

An ejector 56, of generally rectangular cross section and having a length slightly greater than the distance between the shelf and the lower end of the spindle, is mounted for freely floating movement within the outer housing. The ejector comprises a nose projection 58 at its upper end substantially adjacent shelf 53 for cooperation with the stack of records, and a tail projection 60 below lower end 26 of the outer housing 24. Tail projection 60 co-operates with a return spring 62 and an actuation lever 64 in a manner to be described. The nose and tail projections are connected by an ejector shank 66 which constitutes most of the ejector length.

The ejector shank is provided with a pair of opposed convex protrusions or "bumps" 68 which serve as ejector pivots and are laterally supported by the inner walls of hollow lower portion 50. The cross-section of the outer housing is circular at an area 69 where the ejector bearings are supported, while the cross-section of the pair of opposed convex protrusions is rectangular. Also, the inner diameter of the outer housing is slightly larger than the distance across the protrusions. The cross-sectional difference provides a loop or "sloppy" fit in the area of the ejector pivots. Rotation of the ejector about its longitudinal axis is prevented by the longitudinal slot housing the upper half of the ejector.

Return spring 62 is engageable with tail projection 60 of the ejector for maintaining it in an "at-rest" position. When in the at rest position, nose projection 58 is recessed within the longitudinal slot and away from the shelf.

It should be noted that the ejector is movable to a limited degree in the longitudinal direction when secured in the spindle housing. Ejector movement is limited in an upward direction by return spring 62 which is hooked above the tail projection and abuts the bottom of the outer housing. Downward movement of the ejector is limited by the actuation lever in a manner yet to be explained.

The concept of a freely floating ejector is achieved from the lack of pivot pins or the like through the outer housing and the ejector, which would captivate the latter. Instead, the ejector is retained in position by being loosely confined within the outer housing, and vertically supported by the actuation lever. In addition, the ejector pivot points are not fixed, but vary slightly as the ejector changes position within the outer housing.

Referring now to FIGS. 2, 8, and 9, the actuation lever 64 is pivotably mounted below depressed circular portion 4 of pan 2, partially beneath the lower end of spindle 6. A mounting aperture 70 is connected to the main body of the actuation lever by a lever 71 the end of which defines a detent pocket 78. A right angled cammed driving surface 72, having a first side 72*a* and a second side 72*b*, is separated from the detent pocket by a detent slot 73 which provides a passageway for detent stud 44 as velocity trip means 23 initiates movement of the mutilated gear. The right angled cammed driving surface has an apex 75 at the intersection of the first and second sides 72*a* and 72*b*. A recessed portion of the actuation lever includes a sloped horizontal ejector surface 74 and a vertical ejector push-off surface 76 adjacent thereto for co-operation with the ejector tail projection. Actuation lever 64 is biased into a normal position by a slightly tensioned coil spring 79 having a first end anchored at the spindle support 20, and a second end anchored to an upwardly extending post 80 on lever 71.

Actuation lever 64 is driven by the driving stud 40 affixed to the underside of mutilated gear 19 which rotates one full revolution during each record changing cycle. As the mutilated gear is rotated and the driving stud approaches the actuation lever, it slides along the first side 72*a* of the right angled cammed driving surface imparting clockwise pivotal motion (as viewed from above) to the actuation lever against the urging of coil spring 79. The bottom edge of tail projection 60 of the ejector rests upon and slides along sloped horizontal ejector surface 74 during clockwise pivotal movement of the actuation lever. The upward slope of this surface imparts an axial movement to the ejector, lifting it upwardly within the outer housing and lifting the top edge of the head projection above horizontal shelf 53. Further clockwise pivotal movement of the actuation lever causes vertical ejector push-off surface 76 to contact a back side 82 of the tail projection which imparts a lateral or rocking movement in one direction to the ejector, and an opposite movement to nose projection 58. Continued rotation of the mutilated gear and the tension of coil spring 79 causes the actuation lever to rotate counter-clockwise which allows the ejector to gently descend, depositing the stack of records on shelf 53. The rate of return movement is controlled by driving stud 40 camming along second side 72*b*.

As the mutilated gear is driven towards its original position, detent stud 44 affixed to the under side thereof adjacent the geared teeth, enters detent pocket 78 in the actuation lever. When the detent stud first contacts the actuation lever, the lever is pivoted slightly clockwise against the resilience of the coil spring. Further rotation of the mutilated gear drives the detent stud into the detent pocket. Concurrently, the mutilated portion of the gear is driven adjacent geared hub 18 and driving engagement is terminated. Hence, the detent pocket and stud serve to position the mutilated segment of gear 19 adjacent the geared hub, thus preventing free-wheeling of said gear.

*Operational cycle*

Before the record changing cycle commences, the elements are positioned as in FIGS. 2 and 3 with the detent stud in the detent pocket and the ejector in its lowermost position. When the record changing cycle is initiated by velocity trip means 23 as hereinbefore referred to in the Vistain patent, mutilated gear 19 is urged into driving relationship with the geared hub 18. Simultaneously, the detent stud is forced out of detent pocket 78 and through detent slot 73 as the actuation lever pivots slightly against the resilience of coil spring 79. After the detent stud leaves the detent pocket, the coil spring transmits a slight push or "kick" to mutilated gear 19 helping alleviate stalling of the mechanism from the inertia of the non-moving elements.

Releasing the detent imparts a slight rotation to the actuation lever which transmits an axial movement to the ejector. This axial movement lifts the ejector within the outer housing but does not cause any movement of the stack of records, hence it is void of any deleterious consequences.

Figures 4, 5:
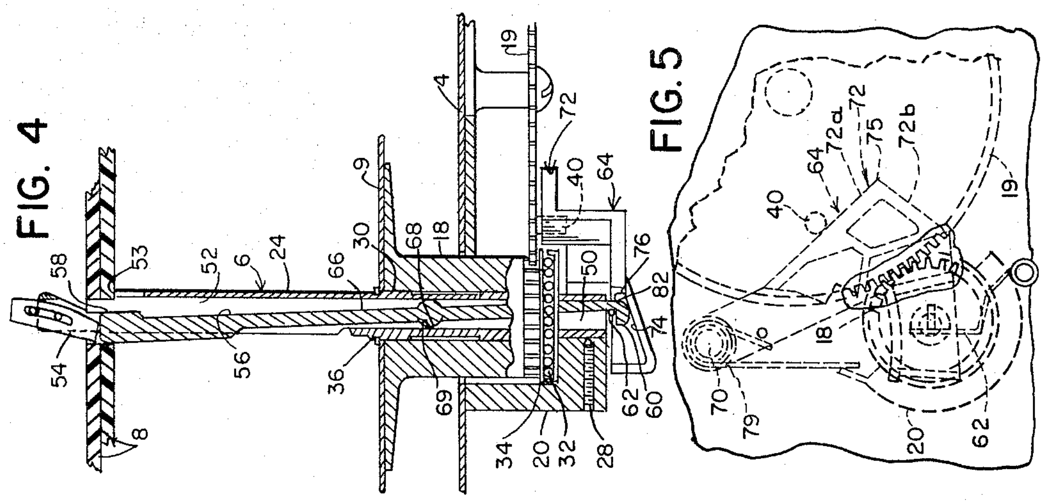

As the mutilated gear is driven approximately 180° the driving stud contacts a first side 72*a* of the right angled cammed driving surface pivoting it clockwise as viewed from above. Pivotal movement of the actuation lever lifts the ejector which rides on the sloped horizontal ejector surface. This ejector movement is sufficient for nose projection 58 to enter the spindle aperture of the lowermost record of the stack. This position of the elements is illustrated in FIGS. 4 and 5. Additional rotation of the mutilated gear moves the driving stud to apex 75 of the right angled cammed surface, which at this time is in the most severe clockwise condition (as viewed from above).

Figures 6, 7:
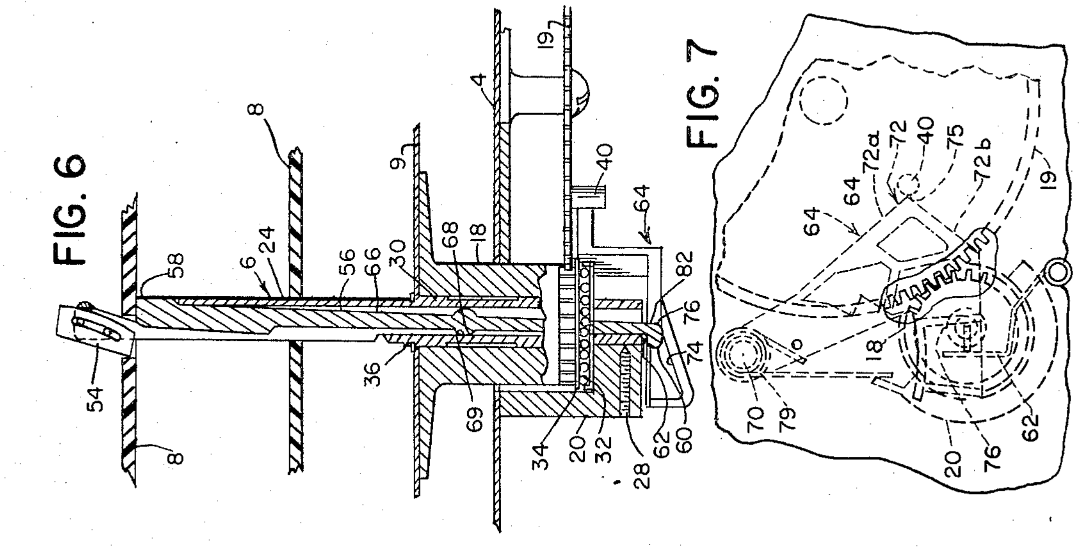
FIGS. 4–5 and 6–7 are similar to FIGS. 2 and 3, but with the ejector and actuation lever in different operating positions.

Immediately prior to this condition, vertical ejector push-off surface 76 begins to contact back side 82 of the ejector tail projection, urging the tail to the position illustrated in FIGS. 6 and 7. The ejector is thus rocked in a clockwise direction (as viewed in FIGS. 2, 4, and 6), with the laterally opposed convex protrusions as the center of rotation. As hereinbefore explained, these protrusions serve as ejector pivots and are laterally supported by the outer housing.

Due to the nature of the freely floating ejector, the exact points where the ejector contacts the outer housing are difficult to determine. While conditions may vary slightly with various tolerances, it is believed that when the elements are positioned as shown in FIG. 6, the left protrusion contacts the outer housing, and the right side of the ejector just below nose projection 58 limits the ejector rocking movement. For other tolerances, the left side of the ejector shank just above tail 60 might be the movement limit point.

Since nose projection 58 is engaged within the spindle aperture of the lowermost record, when the ejector is rocked in a clockwise direction, this record is shifted laterally off the horizontal shelf 53 to a position co-axial with the outer housing while the slider arrangement restrains the penultimate record. With the lowermost record in this position, it has lost all vertical support and falls to the turntable under the force of gravity. The penultimate record now rests on the top edge of the nose projection and would force the ejector downwardly but for the actuation lever supporting its lower end.

As the mutilated gear continues to be driven, the driving stud slides along second side 72*b* of the right angled cammed driving surface allowing the actuation lever to slowly return to its normal position. When the driving stud reaches this last position the mutilated gear is given a push in its direction of rotation by the return action of the coil spring against said driving stud. The slow return of the actuation lever to its original position while supporting the ejector which is being forced downwardly by the weight of the records (except when the last record of the stack is dropped), allows said records to gently rest on the horizontal shelf 53. Also, as the actuation lever returns to its original position the ejector is rocked in a counter-clockwise direction by ejector return spring 62. This movement seats the magazined records securely on the horizontal shelf.

Continued rotation of the mutilated gear during a last portion of the record changing cycle returns the tone arm to the record via clutch means not shown, and the detent stud begins to approach the detent pocket. As the detent stud reaches the actuation lever, the lever is pivoted slightly until the proper detent position is achieved. As this point the mutilated gear is properly positioned in relation to the geared hub to prevent further movement thereof until initiation of a subsequent record change cycle.

In the invention herein described, all screws and springs within the spindle and all pins through the ejector body have been eliminated. This reduces manufacturing problems and eliminates several areas of wear and malfunction. In addition, the actuation lever, of unitary, molded plastic construction, imparts movement to the ejector and provides a detent for the mutilated gear. The one piece construction eliminates much of the connecting linkage and bell cranks necessary in many prior art automatic record changers.

Many modifications and alterations of the invention, far different both in appearance and details of construction from the embodiment herein illustrated, but nevertheless utilizing the basic teachings of the invention, will be readily apparent or devised upon study by persons skilled in the art. Accordingly, the scope of the protection to be afforded should not be limited by the particular embodiment illustrated and described, but should be determined from the description of the essence of the invention which appear in the appended claims.

The embodiments of the invention in which an exclusive property or privilege is claimed are defined as follows:

1. In an automatic record changing phonograph, the combination of: a pan; a motor driven turntable including a gear hub rotatably mounted on said pan; means initiating a record changing cycle; a normally stationary gear rotatably mounted on said pan and adapted for driving engagement with said geared hub responsive to initiation of said record changing cycle; stop means on said gear for stopping rotation of said gear; a vertical spindle including a shelf, secured to said pan co-axial with said turntable for aligning and supporting a stack of records each defining a record spindle aperture; said spindle having an ejector mounted for vertical and rocking movement; said ejector including a nose at its upper end adjacent said shelf for engagement with the aperture of the lowermost record; an actuation lever of unitary construction pivotably mounted on said pan and adapted for movement by engagement with said gear during a record changing cycle; means on said gear for engaging and moving said actuation lever, said actuation lever including means urging said ejector upward to a position such that said ejector nose is partially within the lowermost record spindle aperture and means for subsequently rocking said ejector causing said ejector nose to move laterally; said ejector nose laterally displacing the lowermost record off said shelf to an unsupported position co-axial with said spindle allowing it to gravity drop on to said turntable; and detent means integral with said actuation lever and co-operating with said stop means for stopping rotation thereof.

2. In an automatic record changing phonograph, the combination of: a pan; a spindle secured to said pan for aligning a stack of records each defining a record spindle aperture; said spindle having a shelf supporting said stack of records; slider means on said spindle co-operating with said stack of records for horizontally restraining all except the lowermost record of said stack; a free-floating ejector rockably mounted within said spindle; said ejector including a nose at its upper end adjacent said shelf for engagement with the aperture of the lowermost record; a motor driven turntable rotatably mounted on said pan co-axial with said spindle; means initiating a record-changing cycle; a normally inoperative wheel rotatably mounted on said pan and adapted for driving engagement with said turntable responsive to initiation of said record changing cycle; stop means on said wheel for stopping rotation of said wheel, an actuation lever mounted on said pan and adapted for cyclic movement by said wheel responsive to operation thereof; means on said wheel for engaging and moving said actuation lever, a cam surface on said actuation lever upwardly urging said free-floating ejector to a position partially within the lowermost record spindle aperture during a first portion of the cycle; an ejector pushoff surface adjacent said cam surface rocking said free-floating ejector and laterally moving said ejector nose during a second portion of the cycle; said ejector nose laterally urging said lowermost record off said shelf to a position co-axial with said spindle thereby gravity supplying it to said turntable; and detent means integral with said actuation lever and co-operating with said stop means for stopping rotation thereof.

3. In an automatic record changing phonograph, the combination of: a pan; a spindle secured to said pan for aligning a stack of records each defining a record spindle aperture and having a shelf supporting said stack of records; slider means on said spindle co-operating with said stack of records for horizontally restraining all except the lowermost record of said stack; a free-floating ejector rockably mounted within said spindle; said ejector including a nose at its upper end adjacent said shelf for engagement with the aperture of the lowermost record; a motor driven turntable including a geared hub rotatably mounted on said pan co-axial with said spindle; means initiating a record changing cycle; a normally stationary gear rotatably mounted on said pan adapted for driving engagement with said geared hub responsive to initiation of said record changing cycle; said gear including a driving stud and a detent stud projecting from the surface thereof; an actuation lever pivotably mounted on said pan and having a first cam surface, a second cam surface, an a detent groove; said driving stud cooperating with said first cam surface for imparting pivotal motion to said actuation lever responsive to rotation of said gear; said second cam surface upwardly urging said free-floating ejector to a position where said ejector nose is partially within the lowermost record spindle aperture during a first portion of said pivotal motion; an ejector pushoff surface adjacent said second cam surface rocking said free-floating ejector and laterally moving said ejector nose during a second portion of said pivotal motion; said nose laterally urging said lowermost record off said shelf to a position co-axial with said spindle thereby gravity supplying it to said turntable; said detent stud co-operating with said detent groove for stopping rotation of said gear.

4. In an automatic record changing phonograph, the combination of: a pan; a spindle secured to said pan for aligning a stack of records each defining a record spindle aperture said spindle, including a hollow lower portion interconnected with a slotted upper portion and a shelf for supporting said stack of records; a free-floating ejector rockably mounted within said spindle and having a nose at the top thereof engageable with the lowermost record spindle aperture; means biasing said free-floating ejector to a normally inactive position; slider means on said spindle co-operating with said stack of records for horizontally restraining all except the lowermost record of said stack; a motor driven turntable including a geared hub rotatably mounted on said pan co-axial with said spindle; means initiating a record changing cycle; a normally stationary gear rotatably mounted on said pan adapted for driving engagement with said geared hub responsive to initiation of said record changing cycle; said gear including a driving stud and a detent stud projecting from the surface thereof; an actuation lever pivotably mounted on said pan having a first cam surface, a second cam surface, and a detent groove; said driving stud co-operating with said first cam surface for imparting pivotal motion to said actuation lever responsive to rotation of said gear; said second cam surface upwardly urging said free-floating ejector to a position whereby said nose is intermediate said shelf and said slider and partially within the lowermost record spindle aperture during a first portion of said pivotal motion; an ejector pushoff surface adjacent said second cam surface rocking said free-floating ejector from said inactive position during a second portion of said pivotal motion; said nose moving laterally and engaging said lowermost record to laterally displace it off said shelf to a position co-axial with said spindle thereby gravity supplying said lowermost record to said turntable; said biasing means returning said free-floating ejector to said inactive position during a third portion of said pivotal motion; said detent stud co-operating with said detent groove for terminating rotation of said gear.

5. In an automatic record changing phonograph, the combination of: a pan; a spindle secured to said pan for aligning a stack of records each defining a record spindle aperture, said spindle having a shelf supporting said stack of records; slider means on said spindle co-operating with said stack of records for horizontally restraining all except the lowermost record of said stack; an ejector mounted for movement within said spindle; a motor driven turntable including a geared hub rotatably mounted on said pan co-axial with said spindle; said ejector including a nose at its upper end adjacent said shelf for engagement with the aperture of the lowermost record; means initiating a record changing cycle; a normally stationary gear rotatably mounted on said pan adapted for driving engagement with said geared hub responsive to initiation of said record changing cycle; said gear including a driving stud and a detent stur projecting from the surface thereof; an actuation lever pivotably mounted on said pan and having a first cam surface, a second cam surface, and a detent groove; said driving stud co-operating with said first cam surface for imparting pivotal motion to said actuation lever responsive to rotation of said gear; said second cam surface upwardly urging said ejector to a position partially within the lowermost record spindle aperture during a first portion of said pivotal motion; and ejector pushoff surface adjacent said second cam surface pivoting said ejector and laterally moving said nose during a second portion of said pivotal motion; said ejector nose laterally urging said lowermost record off said shelf to a position co-axial with said spindle thereby gravity supplying it to said turntable; said detent stud cooperating with said detent groove for stopping rotation of said gear.

References Cited

UNITED STATES PATENTS

| | | | |
|---|---|---|---|
| 2,707,639 | 5/1955 | Vistain | 274—10 |
| 2,801,109 | 7/1957 | Vistain | 274—10 |
| 2,987,320 | 6/1961 | Krahulec | 274—10 |

FOREIGN PATENTS

| | | |
|---|---|---|
| 1,028,800 | 4/1958 | Germany. |
| 1,062,951 | 8/1959 | Gremany. |
| 590,794 | 4/1959 | Italy. |

LEONARD FORMAN, *Primary Examiner.*

JOEL M. FREED, *Assistant Examiner.*